(12) United States Patent
Hayashi et al.

(10) Patent No.: US 8,288,056 B2
(45) Date of Patent: Oct. 16, 2012

(54) FUEL CELL AND GASKET FOR FUEL CELL

(75) Inventors: Tomokazu Hayashi, Seto (JP); Fumihiko Inui, Toyota (JP); Hiroshi Takamatsu, Kurume (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 624 days.

(21) Appl. No.: 12/375,539

(22) PCT Filed: Oct. 29, 2007

(86) PCT No.: PCT/IB2007/003261
§ 371 (c)(1),
(2), (4) Date: Jan. 29, 2009

(87) PCT Pub. No.: WO2008/053317
PCT Pub. Date: May 8, 2008

(65) Prior Publication Data
US 2009/0253023 A1    Oct. 8, 2009

(30) Foreign Application Priority Data
Oct. 30, 2006  (JP) ................. 2006-293689

(51) Int. Cl.
 *H01M 2/08* (2006.01)
 *H01M 8/20* (2006.01)
 *F16J 15/02* (2006.01)
(52) U.S. Cl. .................. 429/508; 429/509; 277/654
(58) Field of Classification Search .................. 429/460, 429/469, 508, 509; 277/652, 654
See application file for complete search history.

(56) References Cited

U.S. PATENT DOCUMENTS

| 2,774,621 | A  | * | 12/1956 | Kilbourne, Jr. | 277/652 X |
| 6,607,830 | B2 | * | 8/2003  | Murakami et al. | 277/654 X |
| 7,014,939 | B2 | * | 3/2006  | Suenaga et al. | 429/469 X |
| 7,052,797 | B2 | * | 5/2006  | Nakamura et al. | 429/508 X |
| 7,344,794 | B2 | * | 3/2008  | Tanaka et al. | 429/469 X |
| 7,799,480 | B2 | * | 9/2010  | Nishiyama et al. | 429/469 X |
| 2002/0127461 | A1 |  | 9/2002 | Sugita et al. | |
| 2003/0198857 | A1 | * | 10/2003 | McManus et al. | 429/38 |
| 2007/0122679 | A1 | * | 5/2007 | Hayashi et al. | 429/35 |

FOREIGN PATENT DOCUMENTS

| CA | 2252668 | 8/1998 |
| DE | 197 06 804 A1 | 8/1998 |
| DE | 101 21 176 A1 | 2/2002 |
| DE | 11 2006 000 501 T5 | 1/2008 |
| JP | 62-55874 | 3/1987 |

(Continued)

OTHER PUBLICATIONS

Text of First Office Action for Chinese Application No. 200780027870.6, dated Jun. 10, 2010.

(Continued)

*Primary Examiner* — Stephen J. Kalafut
(74) *Attorney, Agent, or Firm* — Finnegan, Henderson, Farabow, Garrett & Dunner, LLP

(57) ABSTRACT

In a fuel cell including a gasket, which includes a lip portion, as a sealing member, the fuel cell includes a fuel cell constituent element (18) disposed adjacent to the lip portion (50) of the gasket (48), and a non-adhesive layer (54) disposed between the gasket (48) and the fuel cell constituent element (18).

19 Claims, 8 Drawing Sheets

FOREIGN PATENT DOCUMENTS

| | | |
|---|---|---|
| JP | 5-242897 | 9/1993 |
| JP | 8-199536 | 8/1996 |
| JP | 8-209113 | 8/1996 |
| JP | 10-140139 | 5/1998 |
| JP | 11-508349 | 7/1999 |
| JP | 2004-146282 | 5/2004 |
| JP | 2004-165125 | 6/2004 |
| JP | 2005-36567 | 2/2005 |
| JP | 2006-19204 | 1/2006 |
| WO | WO 97/01052 | 1/1997 |
| WO | WO 2005/036685 A2 | 4/2005 |
| WO | WO 2006/025909 | 3/2006 |
| WO | WO 2006/093061 | 9/2006 |

OTHER PUBLICATIONS

Japanese Office Action dated Dec. 26, 2008.
Canadian Office Action for CA 2,658,983 dated Dec. 20, 2010.
Office Action for German Appl. No. 11 2007 002 574.3-45 dated Sep. 26, 2011.

* cited by examiner

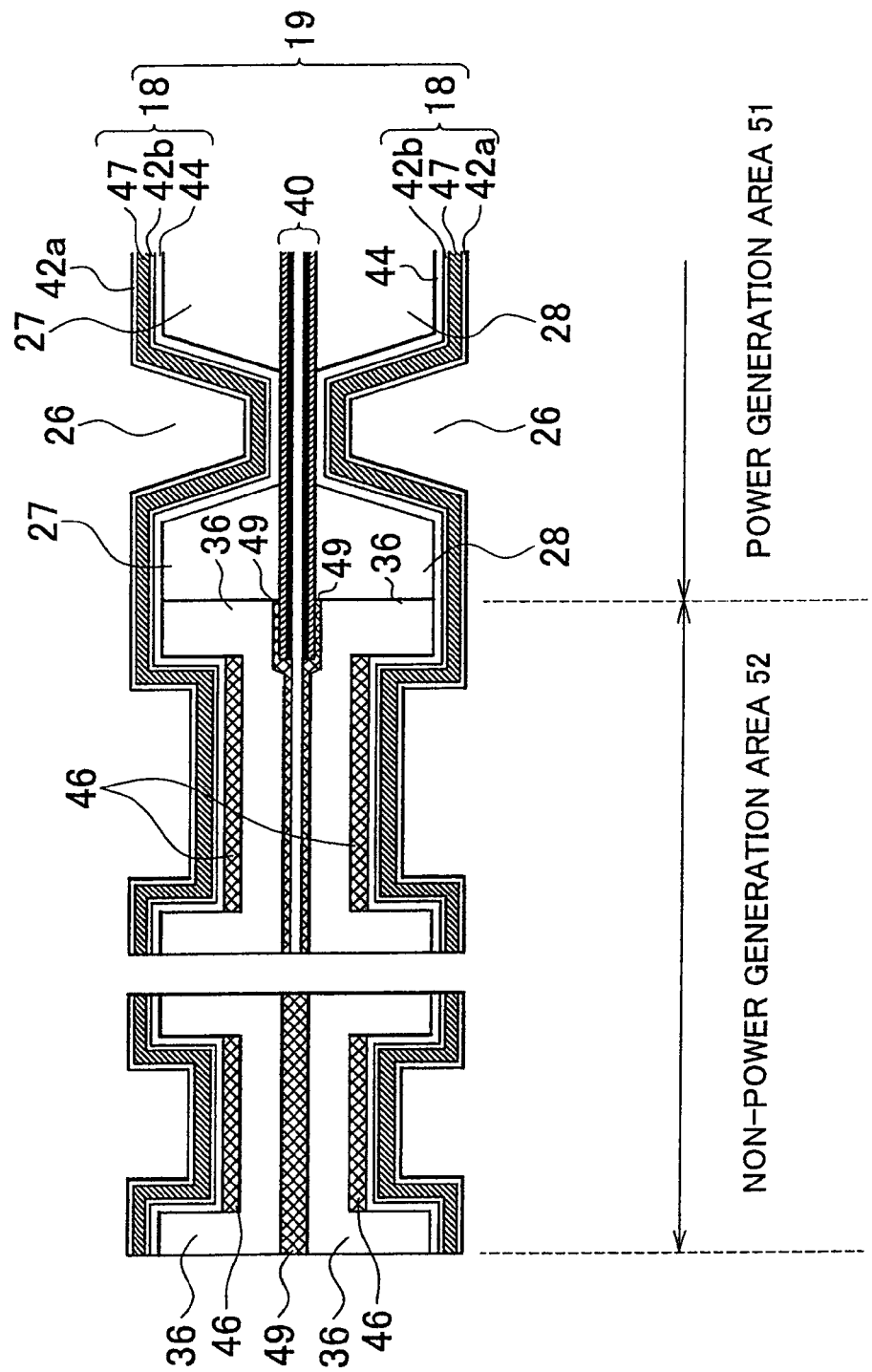

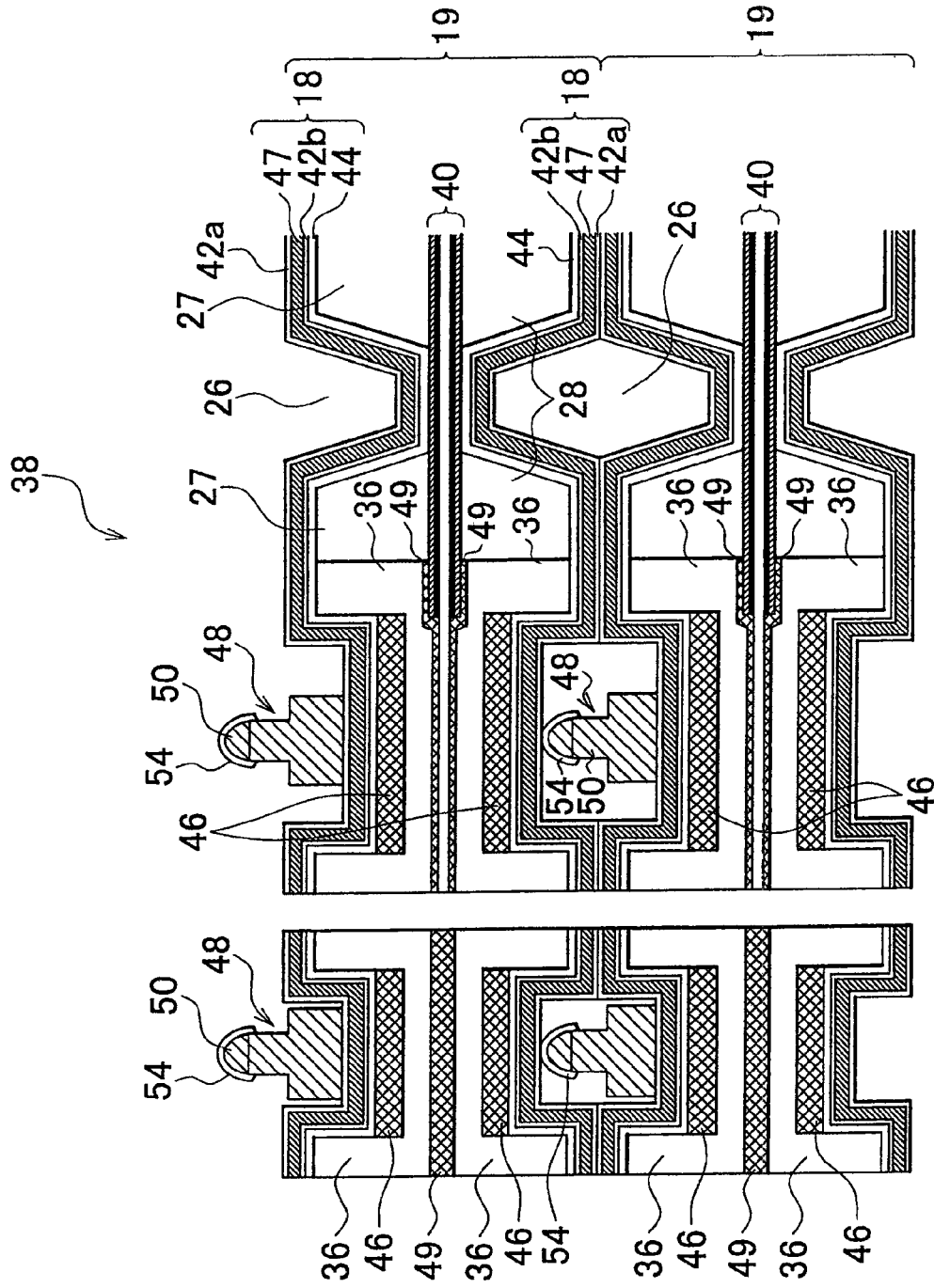

FUEL CELL AND GASKET FOR FUEL CELL

CROSS-REFERENCE TO RELATED APPLICATIONS

This application is a national phase application of International Application No. PCT/IB2007/003261, filed Oct. 29, 2007, and claims the priority of Japanese Application No. 2006-293689, filed Oct. 30, 2006, the contents of both of which are incorporated herein by reference.

BACKGROUND OF THE INVENTION

1. Field of the Invention

The invention relates to a fuel cell and a gasket for a fuel cell.

2. Description of the Related Art

As one of the measures to address environmental and resource-related issues, fuel cells, which generate electric power by converting chemical energy into electric energy through an electrochemical reaction using oxidizing gas, such as oxygen and air, and reducing gas (i.e. fuel gas), such as hydrogen and methane or liquid fuel, such as methanol, etc., have drawn much attention. The fuel cell has been considered and examined from various aspects with expectation that the fuel cell can be an environmentally clean energy source, based on the facts that gases and liquid fuel, which are source material used for generating electric power, are plentifully available, and that only water is produced and discharged from the fuel cell because of the principle of power generation employed in the fuel cell.

A unit fuel cell (i.e. unit cell) includes a membrane electrode assembly (MEA) that is sandwiched by separators, such as metal separators. The MEA includes a fuel electrode (i.e. anode catalyst layer) on one surface of an electrolyte membrane, and an air electrode (i.e. cathode catalyst layer) on the other surface of the electrolyte membrane, so that the fuel electrode and the air electrode are disposed on the opposite sides of the electrolyte membrane. A plurality of unit cells are stacked to form a fuel cell stack. Each separator has fluid passages. More specifically, fuel gas passages and oxidizing gas passages are formed on the surface of the separator facing the MEA. Coolant passages are formed on the surface of the separator opposite to the surface facing the MEA. The fuel gas passages, oxidizing gas passages, and coolant passages are formed in an area of the separator that corresponds to the area of the MEA where electric power is generated (hereinafter simply referred to as "power generation area"). Further, fuel gas manifolds, oxidizing gas manifolds, and coolant gas manifolds are formed in an area of the separator where electric power is not generated (hereinafter simply referred to as "non-power generation area"). Fuel gas flows through the fuel gas manifolds and the fuel gas passages, and oxidizing gas flows through the oxidizing gas manifolds and the oxidizing gas passages. Coolant flows through the coolant manifolds and the coolant passages. These fluid passages are sealed from outside by providing sealing members, such as adhesive agent or gaskets, around the area where the fluid passages are provided. In the two unit cells disposed adjacent to each other, a seal between the separators of the unit cells is provided by a sealing member, such as an adhesive agent or a gasket. For example, Japanese Patent Application Publications No. 2004-165125 (JP-A-2004-165125) and No. 2004-146282 (JP-A-2004-146282) describe that a gasket is provided between two metal separators to seal therebetween.

As described in JP-A-2004-165125 and JP-A-2004-146282, when a rubber gasket is employed as a sealing member used in a fuel cell, adhesion and firm fixation of the rubber gasket can lead to reducing sealability, which is originally the feature of the gasket. For example, when the fuel cell is started at a low temperature, such as at a temperature below the freezing point, the fuel cell stack is thermally expanded, and thus the gasket should behave in compliance with the thermal expansion of the fuel cell stack. However, if the gasket sticks to the separator, compliance of the gasket is reduced. When resistance to pressure should be secured in a steady state, "sealability" is determined based on both of "linear sealing pressure on the gasket" and "adhesion". Thus, the sealability becomes better as the adhesion becomes higher. On the other hand, in a dynamic state, for example, when the fuel cell stack is thermally expanded, if the gasket sticks to the separator at the point where the gasket contacts the separator, deformation of the gasket is restricted. Due to this restriction in deformation, there is a possibility that the cells are locally bent, and weak adhesion portions of the plural cells are deformed due to such local bending, thereby locally creating openings between cells. Therefore, leakage of fluids may occur.

SUMMARY OF THE INVENTION

The invention provides a fuel cell including a sealing structure with excellent sealability, and a gasket for a fuel cell that has excellent sealability.

A fuel cell according to a first aspect of the invention includes a gasket as a sealing member, and the gasket includes a lip portion. The fuel cell includes: a fuel cell constituent element disposed adjacent to the lip portion of the gasket; and a non-adhesive layer disposed between the gasket and the fuel cell constituent element.

Further, in the fuel cell according to the first aspect of the fuel cell, the fuel cell constituent element may be a separator.

Further, in the fuel cell according to the first aspect of the invention, the separator may be made of metal.

Further, in the fuel cell according to the first aspect of the invention, the non-adhesive layer may be a water repellent layer that has higher water repellency than water repellency of the adjacent fuel cell constituent element.

Further, in the fuel cell according to the first aspect of the invention, the non-adhesive layer may be a non-adhesive resin layer.

Further, in the fuel cell according to the first aspect of the invention, the non-adhesive layer may be provided at least on a portion of the adjacent fuel cell constituent element where the adjacent fuel cell constituent element is in contact with the lip portion of the gasket through the non-adhesive layer.

Further, in the fuel cell according to the first aspect of the invention, the non-adhesive layer may be provided at least on a portion of the lip portion of the gasket where the lip portion is in contact with the fuel cell constituent element through the non-adhesive layer.

Further, in the fuel cell according to the first aspect of the invention, a non-adhesive component contained in the non-adhesive layer and a material forming the gasket may have a cross-linked structure at least at an interface between the non-adhesive layer and the portion of the lip portion of the gasket on which the non-adhesive layer is provided.

Further, a gasket for a fuel cell according to a second aspect of invention is used as a sealing member in the fuel cell. In the fuel cell, the gasket includes a lip portion, and a non-adhesive layer is provided at least on a portion of the lip portion of the gasket.

According to the invention, a fuel cell includes a gasket, which has a lip portion, and a non-adhesive layer, which is disposed between the lip portion of the gasket and a fuel cell constituent element disposed adjacent to the lip portion of the gasket. Thus, the invention provides a fuel cell including a sealing structure with excellent sealability.

In addition, according to the invention, a gasket is provided with a non-adhesive layer on the lip portion. Thus, the invention also provides a gasket for a fuel cell with excellent sealability.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein:

FIG. 5 is a schematic sectional view of the unit cell of the fuel cell according to the embodiment of the invention, taken along the line A-A in FIG. 3;

FIG. 6 is a sectional view schematically showing an example of a sealing structure in a cell stack of the fuel cell according to the embodiment of the invention;

DETAILED DESCRIPTION OF EMBODIMENTS

An embodiment of the invention will be hereinafter described. It should be noted that the embodiment herein is just an example to carry out the invention, and the invention is not limited to the embodiment.

<Fuel Cell and Gasket for Fuel Cell>

Figure 1:
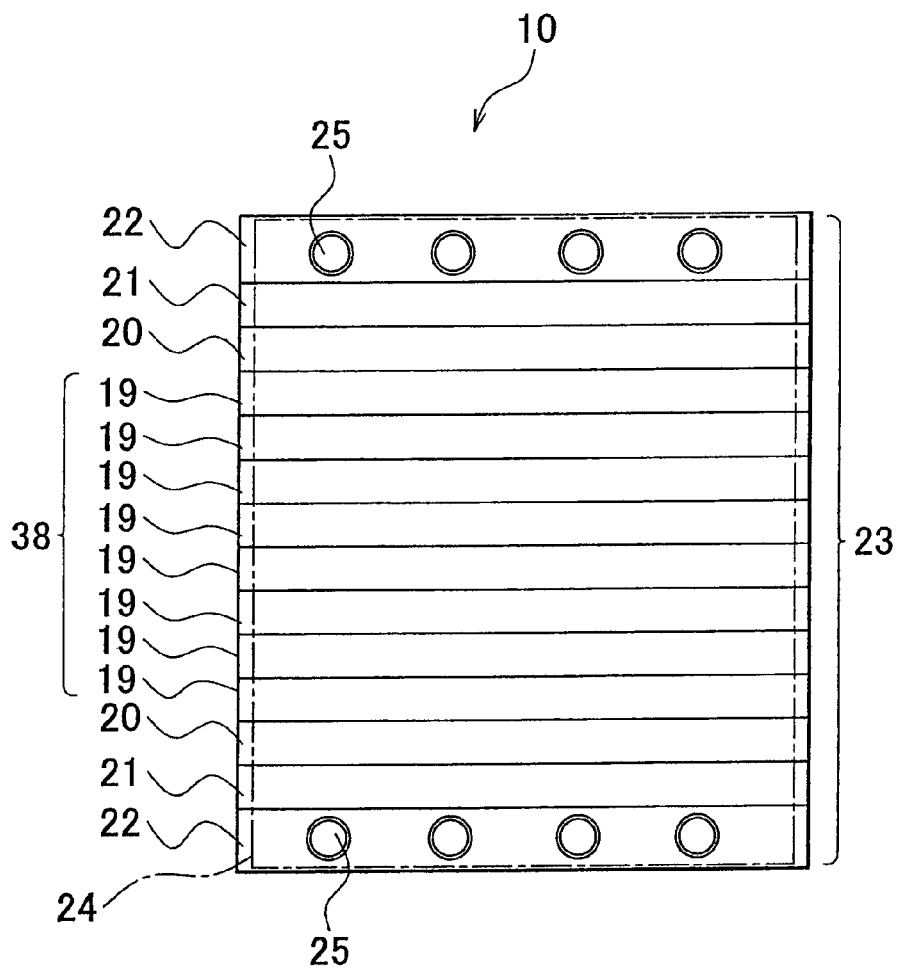
FIG. 1 is a side view schematically showing an example of a fuel cell according to an embodiment of the invention.
Figure 2:
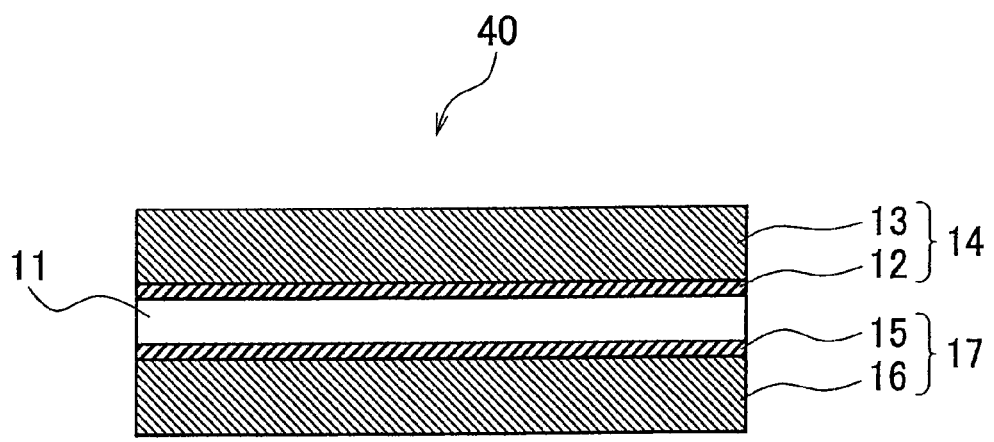
FIG. 2 is a sectional view schematically showing an example of a membrane electrode assembly (MEA) of the fuel cell according to the embodiment of the invention.

FIG. 1 is a side view schematically showing an example of a solid polymer electrolyte fuel cell 10 according to the embodiment. FIG. 2 is a sectional view schematically showing an example of a Membrane Electrode Assembly (MEA) 40 of the fuel cell 10 according to the embodiment. Each of unit cells 19 shown in FIG. 1 is a stack of the MEA 40, which is shown in FIG. 2, and separators.

As shown in FIG. 2, the MEA 40 includes: an electrolyte membrane 11; a fuel electrode (i.e. anode) 14 that includes a catalyst layer 12 disposed on one surface of the electrolyte membrane 11; and an air electrode (i.e. cathode) 17 that includes a catalyst layer 15 disposed on the other surface of the electrolyte membrane 11. A gas diffusion layer 13 is disposed between the catalyst layer 12 and one separator (not shown in FIG. 2) on the anode side, and a gas diffusion layer 16 is disposed between the catalyst layer 15 and another separator (not shown in FIG. 2) on the cathode side. The gas diffusion layers 13, 16 have permeability.

Each of the unit cells 19 includes the MEA 40 and the separators that sandwich the MEA 40 on the outer sides of the gas diffusion layers 13, 16 of the MEA 40. As shown in FIG. 1, the unit cells 19 are stacked to form a cell stack 38. Terminals 20, insulators 21, and end plates 22 are disposed at both ends of the cell stack 38 in a stacking direction of the unit cells 19 (hereinafter simply referred to as "the stacking direction"), and the cell stack 38 are clamped in the stacking direction. The clamped cell stack 38, the terminals 20, the insulators 21, and the end plates 22 thus disposed, and clamp members 24 that are disposed on both sides of the cell stack 38 and extend in the stacking direction (e.g. tension plates), are fixed by bolts and nuts 25, or other means. In this way, a fuel cell stack 23 is constructed. It should be noted that the number of the unit cells 19 stacked in the cell stack 38 may be one or more, and is not particularly limited.

Figure 3:
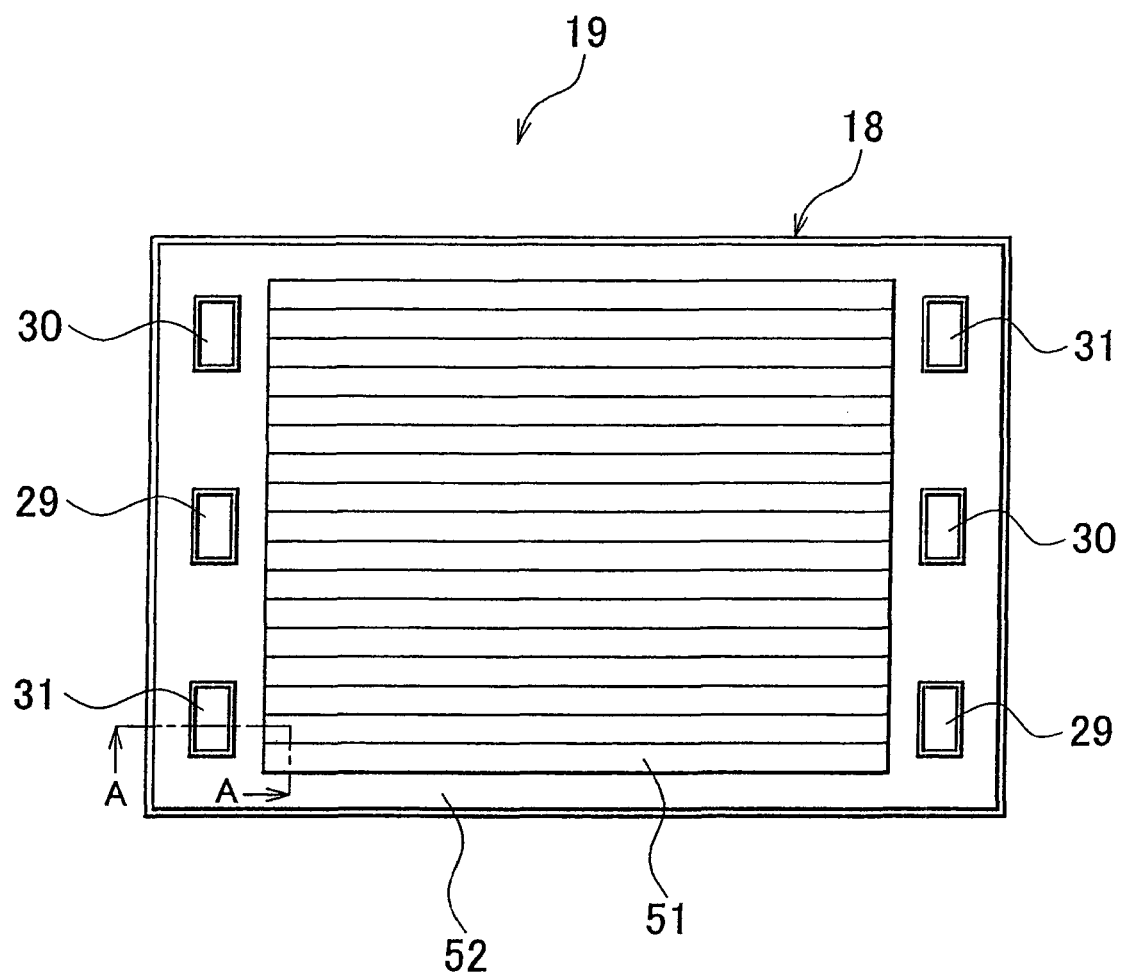
FIG. 3 is a top view schematically showing an example of a unit cell in the fuel cell according to the embodiment of the invention.
Figure 4:
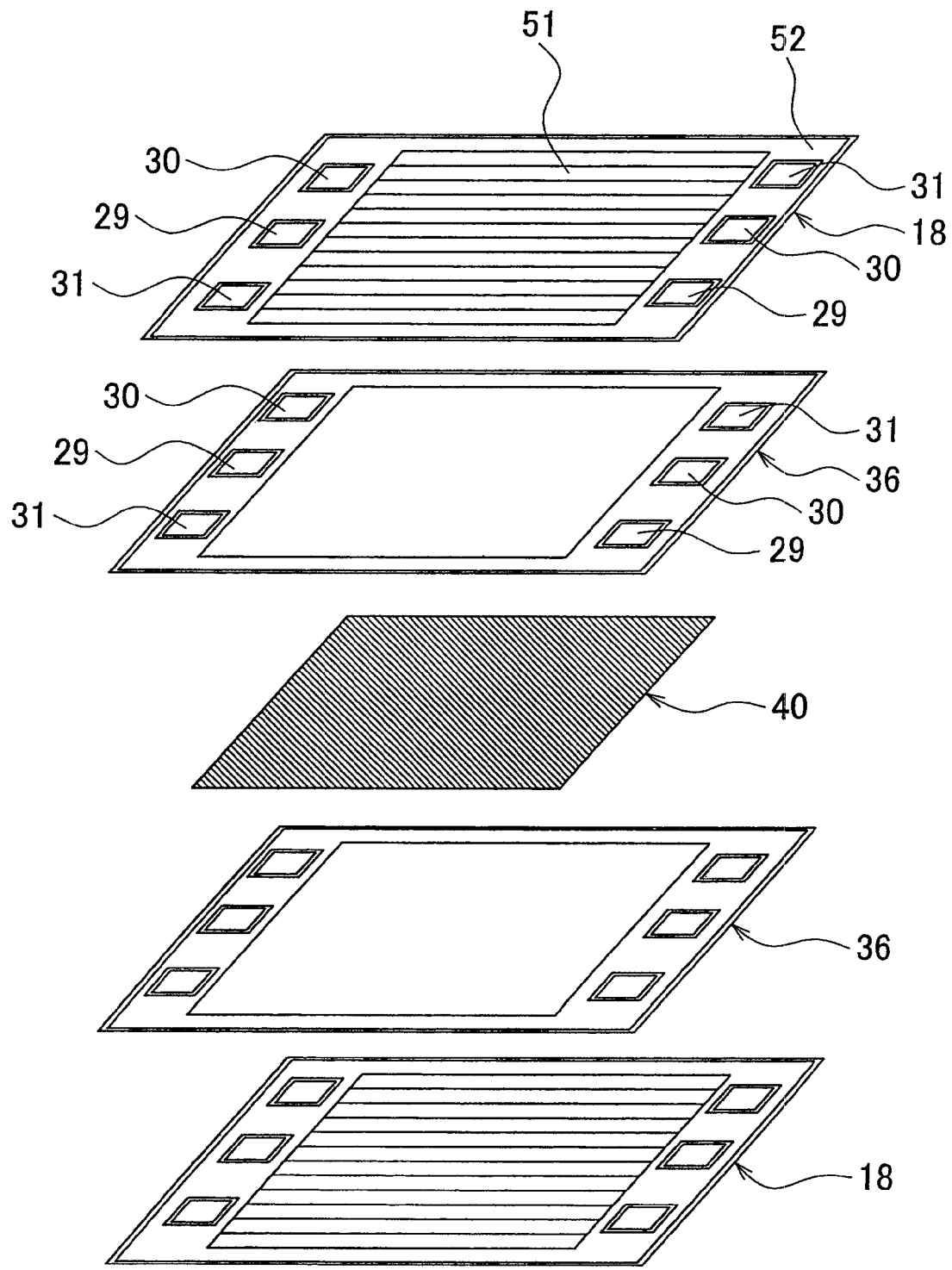
FIG. 4 is a perspective view schematically showing an exploded view of the example unit cell in the fuel cell according to the embodiment of the invention.

FIG. 3 is a top view schematically showing one example of the unit cell 19. The unit cell 19 has: in the middle thereof, a power generation area 51 in which gas passages, coolant passages, and electrodes are provided, and in which electric power is generated; and, around the power generation area 51, a non-power generation area 52 in which electric power is not generated. The separators employed in the embodiment are metal separators 18. FIG. 4 is a perspective view schematically showing the exploded view of the unit cell 19. As shown in FIG. 4, in the unit cell 19, a resin frame 36, of which the central area corresponding to the power generation area 51 is open, is provided between the MEA 40 and the metal separator 18 in the non-power generation area 52 on each side of the MEA 40. The MEA 40 is sandwiched by the two resin frames 36, and the MEA 40 sandwiched by the resin frames 36 is further sandwiched by the two metal separators 18. The metal separators 18 and the resin frames 36 have fuel gas manifolds 30, oxidizing gas manifolds 31, and coolant manifolds 29 that are formed in the non-power generation area 52. It should be noted that the positions at which the fuel gas manifolds 30, the oxidizing gas manifolds 31, and the coolant manifolds 29 are disposed in the non-power generation area 52 are not limited to the positions as shown in FIGS. 3 and 4.

FIG. 5 is a schematic sectional view taken along the line A-A in FIG. 3. In the power generation area 51, the metal separators 18 define fuel gas passages 27 for supplying fuel gas (typically, hydrogen gas) to the anode side of the MEA 40, and define oxidizing gas passages 28 for supplying oxidizing gas (oxygen; typically, air) to the cathode side of the MEA 40. Each metal separator 18 also defines coolant passages 26 for allowing coolant (typically, cooling water) to flow therethrough, along with the adjacent metal separator 18. The fuel gas manifolds 30 shown in FIGS. 3 and 4 communicate with the fuel gas passages 27 shown in FIG. 5; the oxidizing gas manifolds 31, the oxidizing gas passages 28; and the coolant manifolds 29, the coolant passages 26. The manifolds 30, 31, 29 communicate with the fluid passages 27, 28, 26 provided in the power generation area 51, respectively, through communication passages (not shown), and fluids also flow through the communication passages. Typically, in the single unit cell 19, a plurality of the coolant passages 26 are provided and disposed parallel to each other. A plurality of fuel gas passages 27 and a plurality of oxidizing gas passages 28 are provided and disposed in the same manner as the coolant passages 26.

Typically, in the metal separator 18, a noble metal coating 42a is formed on a surface of a metal separator base material 47, which is opposite to a surface of the metal separator base material 47 facing the MEA 40, in order to minimize electric contact resistance between the two adjacent unit cells 19. A noble metal coating 42b, or the noble metal coating 42b and corrosion-resistant coating 44, is/are formed on the surface of the metal separator base material 47 facing the MEA 40, in order to minimize the electric contact resistance between the metal separator 18 and the MEA 40, and prevent corrosion of the metal separator 18 caused due to oxide components, etc., contained in source gas (fuel gas, oxidizing gas) and water produced. Among the surface coatings, the corrosion-resistant coating 44 may be formed on portions of the metal separator base material 47 that define the communication passages. It should be noted that the construction of the metal separator 18 is not limited to the construction described herein.

An adhesive layer 49 formed by an adhesive agent or the like provides a seal between the two resin frames 36 that sandwich the MEA 40. An adhesive layer 46 formed by an adhesive agent or the like provides a seal between the resin frame 36 and the metal separator 18 on which the surface coating is formed, such as the noble metal coatings 42a, 42b and the corrosion-resistant coating 44.

In the embodiment, a gasket provided with a lip portion provides a seal between the adjacent two unit cells 19, and a non-adhesive layer is provided between the gasket and the corresponding metal separator 18 disposed adjacent to the lip portion of the gasket. FIG. 6 is a sectional view schematically showing one example of a portion of the cell stack 38 in which a gasket 48 provides a seal between adjacent two unit cells 19. In FIG. 6, the adhesive layer 46 provides a seal between the metal separator 18 and the corresponding resin frame 36, and the adhesive layer 49 provides a seal between the resin frames 36. The gasket 48 provides a seal between the metal separators 18 of the two adjacent unit cells 19. The non-adhesive layer 54 is provided between the gasket 48 and the metal separator 18 disposed adjacent to the lip portion 50 of the gasket 48. In the example shown in FIG. 6, the non-adhesive layer 54 is provided at least on a portion of the lip portion 50 of the gasket 48 where the lip portion 50 is in contact with the metal separator 18 disposed adjacent to the lip portion 50, through the non-adhesive layer 54. The gaskets 48 provide seals against the fluids (fuel gas, oxidizing gas, and coolant) flowing through the fuel gas manifolds 30, the oxidizing gas manifolds 31, and the coolant manifolds 29, separating the fluids from each other and from outside. The gaskets 48 are provided around the power generation area 51 where the fluid passages 26, 27, 28 are provided, and also provided around the area where the manifolds 29, 30, 31 are provided, except at the communication passage portions. In this way, the gaskets 48 are employed as the sealing members, which makes it possible to easily remove and disassemble the unit cells 19.

Figure 7A:
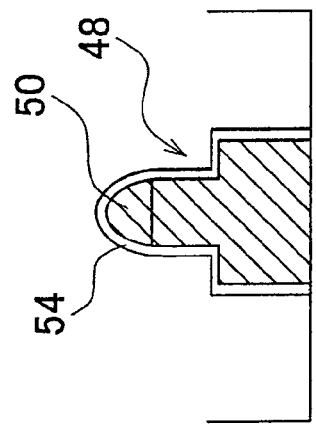
FIG. 7 is a sectional view schematically showing an example of a non-adhesive layer of a gasket for a fuel cell according to the embodiment of the invention.
Figure 7B:
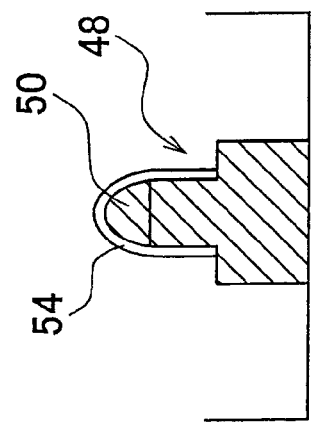
Figure 7C:
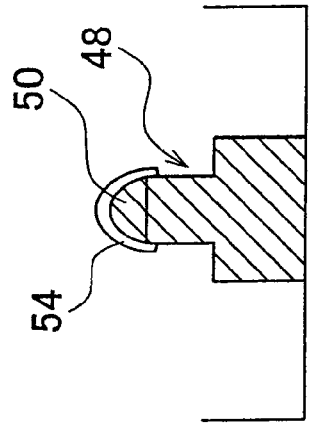

The cause of sticking of the gaskets 48 to the metal separator 18 may be: adhesion caused due to functional groups existing on the surfaces of the gaskets 48; adhesion caused due to adhesive, low molecular weight components of the gaskets 48; and suction caused due to minute unevenness existing on the surfaces of the gaskets 48. In consideration of this problem, the non-adhesive layer 54 is provided at least on a portion (contact portion) of the lip portion 50 of each gasket 48 where the lip portion 50 is in contact with the metal separator 18 through the non-adhesive layer 54. Due to the gasket thus configured, the gasket 48 is less likely to stick to the metal separator 18, so that compliance of the gasket 48 is improved. Alternatively, as schematically shown by the sectional view in FIG. 7A, the non-adhesive layer 54 may be provided at least on a portion (contact portion) of the lip portion 50 where the lip portion 50 is in contact with the adjacent element constituting the fuel cell (hereinafter referred to as "fuel cell constituent element"), through the non-adhesive layer 54. Further, as shown in FIG. 7B, the non-adhesive layer 54 may be provided on the entire surface of the lip portion 50. Alternatively, as shown in FIG. 7C, the non-adhesive layer 54 may be provided on the entire surface of the gasket 48.

The material for the non-adhesive layer 54 may be any material as long as the material has non-adhesive properties, and is not particularly limited. For example, a resin layer containing polyolefin resin, etc., such as polyethylene or polypropylene, may be employed as the non-adhesive layer 54. Indices of non-adhesive properties include water repellency. The non-adhesive layer 54 may be a water-repellent layer that has higher water repellency than that of the fuel cell constituent element (in the embodiment, the metal separator) disposed adjacent to the non-adhesive layer 54. Note that, the term "higher water repellency" indicates that a water contact angle of the water-repellent layer is larger than the water contact angle of the adjacent fuel cell constituent element. The examples of the water-repellent layer include a fluorine resin layer, such as a layer made of tetrafluoroethylene, a polyimide resin layer, and a polyamide-imide resin layer.

Non-adhesive components contained in the non-adhesive layer 54 and the material forming the gasket 48 may be cross-linked at least at the interface between the non-adhesive layer 54 and the gasket 48. In this case, the non-adhesive components are less likely to melt, and excellent acid resistance and durability, for example, are achieved.

The non-adhesive layer 54 has, for example, a nanometer-order thickness.

Further, an even surface of the lip portion 50 of the gasket 48 may serve as the non-adhesive layer 54. In other words, a portion of the lip portion 50 where the lip portion 50 is in contact with the adjacent fuel cell constituent element may be mirror finished so that the mirror-finished surface functions as the non-adhesive layer 54. In this specification, the mirror-finished surface of the lip portion 50 is also referred to as the "non-adhesive layer 54".

The material forming the gasket 48 may be, for example, silicone rubber, such as VMQ, fluorine rubber, such as FKM, or ethylene propylene diene monomer (EPDM) rubber.

Figure 8:
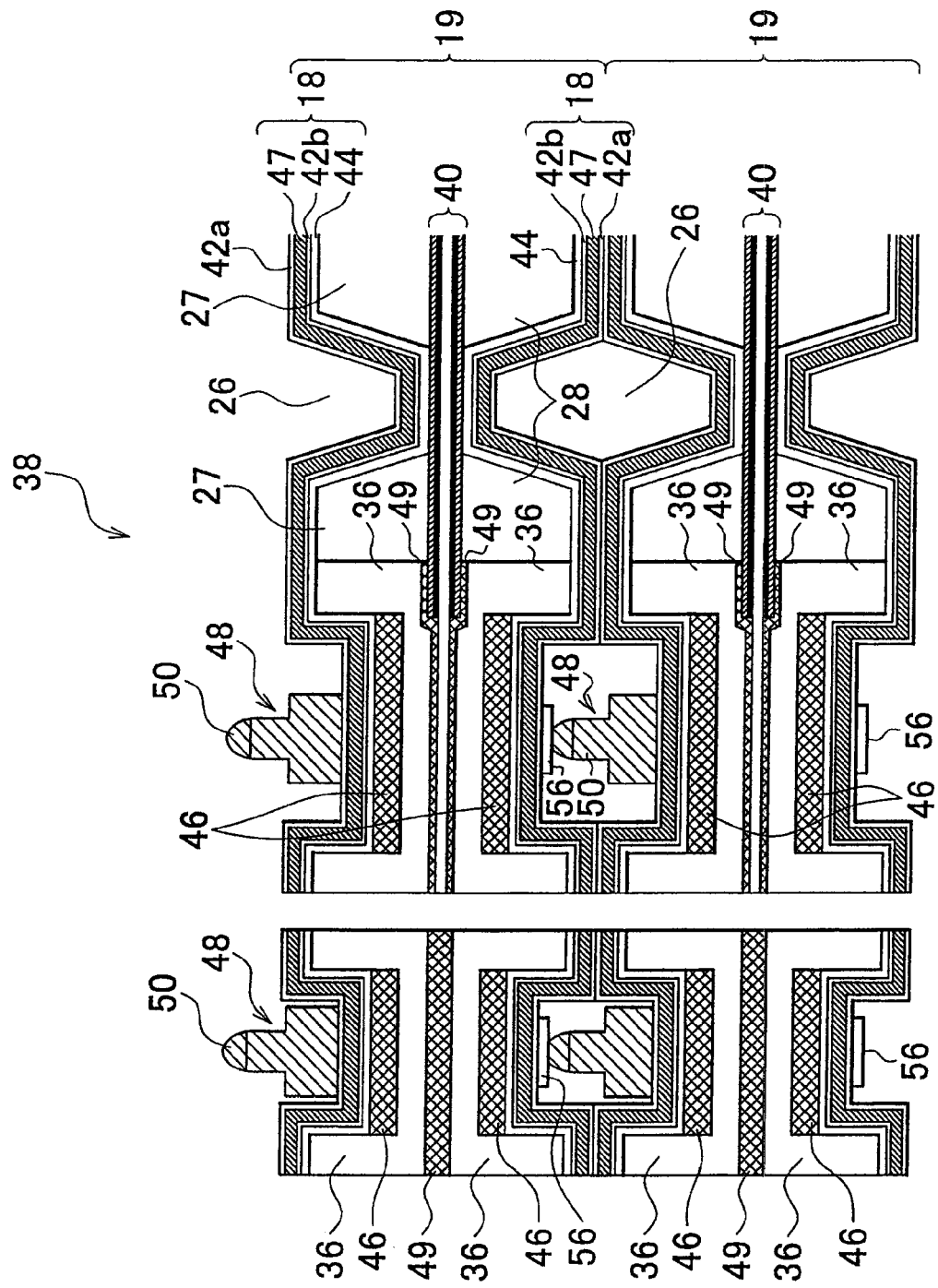
FIG. 8 is a sectional view schematically showing another example of the sealing structure in the cell stack of the fuel cell according to the embodiment of the invention.

FIG. 8 is a sectional view schematically showing another example of the cell stack 38 in which a seal between the adjacent two unit cells 19 is provided by the gasket 48. In the example shown in FIG. 8, a non-adhesive layer 56 is provided at least on a portion of the metal separator 18 where the metal separator 18 is in contact with the lip portion 50 of the gasket 48 disposed to face the metal separator 18, through the non-adhesive layer 56.

If the non-adhesive layer 56 is provided at least on a portion of the metal separator 18 where the metal separator 18 is in contact with the lip portion 50 of the gasket 48 through the non-adhesive layer 56, the gasket 48 is less likely to stick to the metal separator 18, so that the compliance of the gasket 48 is improved. It suffices that the non-adhesive layer 56 is provided at least on a portion of the metal separator 18 where the metal separator 18 is in contact with the gasket 48 through the non-adhesive layer 56. The non-adhesive layer 56 may therefore be provided on the entire surface of the metal separator 18 that faces the gasket 48.

The material of the non-adhesive layer 56 may be any material as long as the material has non-adhesive properties similar to the aforementioned non-adhesive layer 54, and is not particularly limited. For example, a resin layer containing polyolefin resin, etc., such as polyethylene or polypropylene, may be employed as the non-adhesive layer 56. Further, the non-adhesive layer 56 may be a water-repellent layer that has higher water repellency than that of the fuel cell constituent element (in the embodiment, the metal separator) disposed adjacent to the non-adhesive layer 56. The examples of the water-repellent layer include a fluorine resin layer, such as a layer made of tetrafluoroethylene, a polyimide resin layer, and a polyamide-imide resin layer.

The non-adhesive layer 56 has, for example, a nanometer-order thickness, similar to the non-adhesive layer 54.

Further, at least a portion of the metal separator 18 where the metal separator 18 is in contact with the lip portion 50 of the gasket 48 may be mirror finished so that the mirror-finished surface functions as the non-adhesive layer 56. In this specification, the mirror-finished portion of the metal separator 18 is also referred to as the "non-adhesive layer 56".

Figure 9:
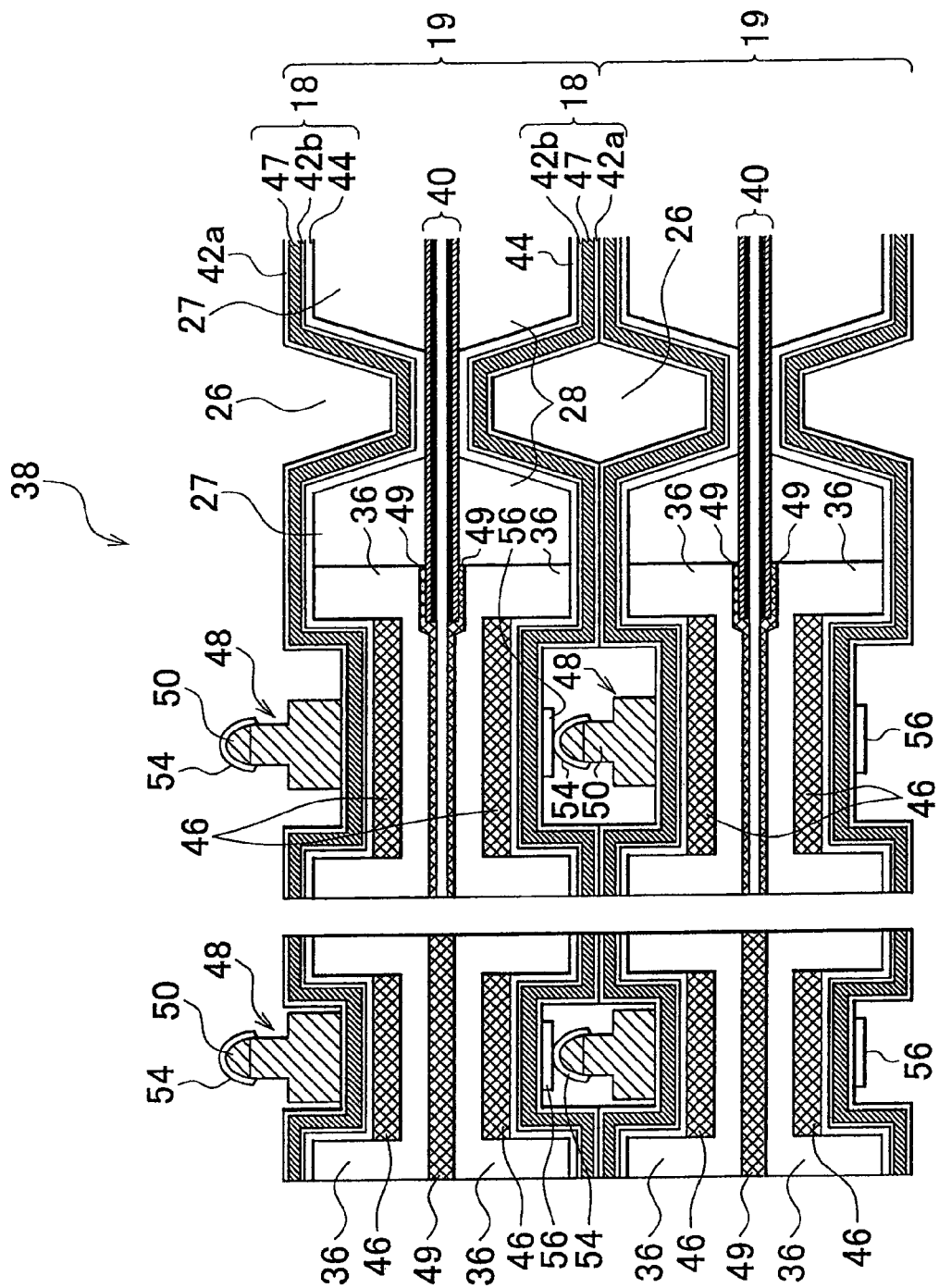
FIG. 9 is a sectional view schematically showing yet another example of the sealing structure in the cell stack of the fuel cell according to the embodiment of the invention.

As described above, the non-adhesive layer 54 may be provided at least on a portion of the lip portion 50 of the gasket 48 where the lip portion 50 is in contact with the metal separator 18 through the non-adhesive layer 54, as shown in FIGS. 6 and 7. Alternatively, the non-adhesive layer 56 may be provided at least on a portion of the metal separator 18 where the metal separator 18 is in contact with the gasket 48 through the non-adhesive layer 56, as shown in FIG. 8. In the case where the non-adhesive layer 56 is provided at least on a portion of the metal separator 18 as shown in FIG. 8, manufacturing of the fuel cell is relatively easy. On the other hand, if the non-adhesive layer 54 is provided at least on a portion of the lip portion 50 of the gasket 48 as shown in FIGS. 6 and 7, the durability can be improved. Further, as shown in FIG. 9, if both of the non-adhesive layers 54, 56 are provided on a portion of the lip portion 50 and a portion of the metal separator 18, respectively, in the manner described above, non-adhesiveness of the gasket 48 to the metal separator 18 is further improved, so that the compliance of the gasket 48 is improved.

As described above, because the non-adhesive layer is provided between the lip portion of the gasket and the fuel cell constituent element (in the embodiment, separator) disposed adjacent to the lip portion of the gasket, the compliance of the gasket is improved, and sealability is also improved. In particular, when the fuel cell is started at a low temperature, such as a temperature below the freezing point, the fuel cell stack is thermally expanded. According to the embodiment, the gasket can behave in compliance with the thermal expansion of the fuel cell stack.

In the embodiment, the separator is employed as an example of the fuel cell constituent element disposed adjacent to the lip portion of the gasket. However, the fuel cell constituent element is not particularly limited as long as the fuel cell constituent element is disposed adjacent to the lip portion of the gasket. Examples of the fuel cell constituent element include the resin frame, the electrolyte membrane, etc.

In the embodiment, the material forming the metal separator base material 47 may be, for example, stainless steel, aluminum or aluminum alloy, titanium or titanium alloy, magnesium or magnesium alloy, copper or copper alloy, nickel or nickel alloy, or steel. When the surface portion of the metal separator base material 47 forms a passive-state layer, the passive-state layer is considered to be a part of the metal separator base material 47. Further, even when a separator formed of carbon-based material, such as calcined carbon, is employed in place of the metal separator 18, the advantageous effects achieved by providing the non-adhesive layer as described above can also be achieved. However, the invention is more effective when metal separators are used than when carbon separators are used, because metal separators cause a relatively large thermal expansion of the cells.

The noble metal coatings 42a, 42b are formed containing, for example, gold, silver, platinum, palladium, or an alloy of such a noble metal. The corrosion-resistant coating 44 is formed containing, for example, carbon.

The resin frame 36 is formed of, for example, fluorine resin.

The adhesive layers 46, 49 are formed containing, for example, an adhesive agent such as resin, such as silicone, olefin, epoxy, and acrylic. The adhesive agent is in a liquid form when applied, and is pressed and spread by the members sandwiching the adhesive layer. Then, the adhesive agent applied is set by drying or heating.

The material for the electrolyte membrane 11 may be any material as long as the material has high ionic conductivity, such as high proton ($H^+$) conductivity, and is not particularly limited. For example, solid polymer electrolyte, such as perfluorosulfonic acid-based material, may be employed as the material for the electrolyte membrane 11. More specifically, perfluorosulfonic acid-based, solid polymer electrolyte, such as GoreSelect (registered trademark) made by Japan Gore-Tex Inc., Nafion (registered trademark) made by DuPont, Aciplex (registered trademark) made by Asahi Kasei Corporation, or Flemion (registered trademark) made by Asahi Glass Co., Ltd., may be employed as the material for the electrolyte membrane 11.

The catalyst layers 12, 15 are formed by dispersing, for example, a catalyst in a resin, such as solid polymer electrolyte including Nafion (registered trademark). Examples of the catalyst include carbon supporting platinum (Pt) or the like, and carbon supporting platinum (Pt) or the like along with another metal, such as ruthenium (Ru).

The material for the gas diffusion layers 13, 16 may be any material as long as the material has high electric conductivity and high diffusivity of source material, such as fuel and air, and is not particularly limited. For example, a porous, electrically conductive material may be employed as the material for the gas diffusion layers 13, 16. Examples of the material having high electric conductivity include a metal plate, a metal film, electrically conductive polymer, and carbon material. Examples of the carbon materials include a carbon cloth, a carbon paper, and glass carbon, and, among others, porous carbon material, such as a carbon cloth and a carbon paper, is preferable.

If the fuel cell 10 is operated in a state where hydrogen gas is supplied to the fuel electrode 14 as fuel gas, and air is supplied to the air electrode 17 as oxidizing gas in the unit cells 19, for example, hydrogen ions ($H^+$) and electrons ($e^-$) are produced in the catalyst layer 12 of the fuel electrode 14 from the supplied hydrogen gas ($H_2$) through the hydrogen oxidation reaction represented by a reaction formula $2H_2 \rightarrow 4H^+ + 4e^-$. The electrons ($e^-$) move from the gas diffusion layer 13 through an external circuit, and reaches the catalyst layer 15 after passing through the gas diffusion layer 16 of the air electrode 17. In the catalyst layer 15, water is produced through the oxygen reduction reaction represented by a reaction formula $4H^+ + O_2 + 4e^- \rightarrow 2H_2O$, from oxygen ($O_2$) that is contained in the air supplied, the hydrogen ions ($H^+$) that have passed through the electrolyte membrane 11, and the electrons ($e^-$) that reach the catalyst layer 15 through the external circuit. In this way, chemical reactions occur at the fuel electrode 14 and the air electrode 17, and electric charge is generated, whereby the fuel cell 10 functions as a battery. Further, the aforementioned series of chemical reactions produce only water, and this makes the fuel cell environmentally clean.

<Method of Manufacturing Gasket for Fuel Cell and Method of Manufacturing Fuel Cell>

The gasket for a fuel cell, which includes the non-adhesive layer at least on the lip portion as described above, may be produced by a method including a molding step, an application step, and a cross-linking step. In the molding step, the gasket is fabricated by molding. In the application step, a nonstick treatment agent is applied at least on a portion of the surface of the lip portion of the gasket. In the cross-linking step, the nonstick treatment agent is cross-linked.

First, in the molding step, the gasket is fabricated by molding using the aforementioned VMQ, FKM, or EPDM, etc. (primary vulcanization). Then, in the application step, a nonstick treatment agent is applied at least on a portion of the surface of the lip portion of the gasket. Note that, the nonstick treatment agent may have a reactive site at which the nonstick treatment agent and the material forming the gasket are co-cross-linked. Further, the nonstick treatment agent may be the type of agent whose cross-linking reaction can be completed under the heat and time conditions similar to those used in secondary vulcanization of the gasket that follows the application step. Finally, in the cross-linking step, the nonstick treatment agent and the material forming the gasket are cross-linked (secondary vulcanization).

The nonstick treatment agent may be one obtained by dissolving the non-adhesive components, such as polyolefin resin, such as polyethylene or polypropylene, or fluorine resin, such as polytetrafluoroethylene, in a solvent.

Further, the gasket for a fuel cell that includes the non-adhesive layer at least on the lip portion may be manufactured using a method including an application step and a molding step. In the application step, the nonstick treatment agent is applied at least on a portion of an inner surface of a metal mold for molding the gasket In the molding step, the gasket is fabricated using the metal mold.

The aforementioned manufacturing methods make it possible to manufacture the gasket for a fuel cell whose non-adhesive components are less likely to melt, and whose acid resistance and durability, for example, are excellent.

If the non-adhesive components and the material forming the gasket are not cross-linked, the nonstick treatment agent may be applied to a desired portion of the gasket by spraying using, for example, a masking method. Further, if the surface of the lip portion is mirror-finished to obtain the non-adhesive layer, the surface of the lip portion may be processed by, for example, polishing.

The aforementioned methods are just examples of the method of manufacturing the gasket for a fuel cell, and the manufacturing method is not limited to the aforementioned methods.

If the non-adhesive layer is formed on a portion of the surface of the separator where the gasket is in contact with the separator, the nonstick treatment agent may be applied to a desired portion of the separator by spraying using, for example, a masking method. However, the method of forming the non-adhesive layer on the separator is not limited to this method.

With regard to the following steps, in accordance with known methods, a predetermined number of the unit cells are stacked with the unit cells sealed with the aforementioned gasket for a fuel cell and the separators, whereby a fuel cell is obtained.

The fuel cell according to the embodiment can be used as a compact power source for mobile devices, such as a cellular phone and a mobile computer, a vehicle power source, and a household power source.

While the invention has been described with reference to exemplary embodiments thereof, it should be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention claimed is:
1. A fuel cell, comprising:
a gasket including a lip portion as a sealing member;
a fuel cell constituent element disposed adjacent to the lip portion of the gasket; and
a non-adhesive layer disposed between the gasket and the fuel cell constituent element,
wherein the gasket comprises a first material and the non-adhesive layer comprises a second material, the second material being different from the first material.
2. The fuel cell according to claim 1, wherein:
the fuel cell constituent element is a separator.
3. The fuel cell according to claim 2, wherein:
the separator is made of a metal.
4. The fuel cell according to claim 1, wherein:
the non-adhesive layer is a water repellent layer that has higher water repellency than water repellency of the adjacent fuel cell constituent element.
5. The fuel cell according to claim 1, wherein:
the non-adhesive layer is a non-adhesive resin layer.
6. The fuel cell according to claim 1 wherein:
the non-adhesive layer is provided at least on a portion of the adjacent fuel cell constituent element where the adjacent fuel cell constituent element is in contact with the lip portion of the gasket through the non-adhesive layer.
7. The fuel cell according to claim 1, wherein:
the non-adhesive layer is provided at least on a portion of the lip portion of the gasket where the lip portion is in contact with the fuel cell constituent element through the non-adhesive layer.
8. The fuel cell according to claim 7, wherein:
a non-adhesive component contained in the non-adhesive layer and a material forming the gasket have a cross-linked structure at least at an interface between the non-adhesive layer and the portion of the lip portion of the gasket on which the non-adhesive layer is provided.
9. The fuel cell according to claim 1, wherein the second material comprises a resin layer containing polyolefin resin.
10. The fuel cell according to claim 9, wherein the second material comprises polyethylene or polypropylene.
11. The fuel cell according to claim 1, wherein the non-adhesive layer is disposed on an entire surface of the lip portion.
12. The fuel cell according to claim 1, wherein the non-adhesive layer is disposed on an entire surface of the gasket.
13. The fuel cell according to claim 1, wherein the non-adhesive layer comprises a mirror-finished surface formed on the portion of the lip portion.
14. The fuel cell according to claim 1, wherein another non-adhesive layer is disposed on at least a portion of the fuel cell constituent element.
15. A gasket for a fuel cell used as a sealing member in the fuel cell, wherein:
the gasket includes a lip portion, and a non-adhesive layer is provided at least on a portion of the lip portion of the gasket, wherein the non-adhesive layer comprises a mirror-finished surface formed on the portion of the lip portion, and
wherein the gasket comprises a first material and the non-adhesive layer comprises a second material, the second material being different from the first material.
16. The gasket according to claim 15, wherein the second material comprises a resin layer containing polyolefin resin.
17. The gasket according to claim 16, wherein the second material comprises polyethylene or polypropylene.
18. The gasket according to claim 15, wherein the non-adhesive layer is disposed on an entire surface of the lip portion.
19. The gasket according to claim 15, wherein the non-adhesive layer is disposed on an entire surface of the gasket.

* * * * *